United States Patent
Hayashi et al.

(10) Patent No.: US 6,365,701 B1
(45) Date of Patent: Apr. 2, 2002

(54) INK-CONTACTING MEMBER, INK-ABSORBING MEMBER, INK TANK AND INK-JET CARTRIDGE

(75) Inventors: Hiroki Hayashi; Hajime Yamamoto; Eiichiro Shimizu, all of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/321,111

(22) Filed: May 27, 1999

(30) Foreign Application Priority Data

May 29, 1998 (JP) .......................................... 10-148598
May 25, 1999 (JP) .......................................... 11-144207

(51) Int. Cl.[7] .............................................. C08G 18/67
(52) U.S. Cl. .............................. 528/75; 528/59; 347/85
(58) Field of Search .............................. 528/75, 59, 86, 528/285, 210; 347/85

(56) References Cited

U.S. PATENT DOCUMENTS

| | | | |
|---|---|---|---|
| 3,839,274 A | 10/1974 | Beears | 260/45.8 N |
| 4,025,486 A | 5/1977 | Gilles | 260/45.8 NT |

FOREIGN PATENT DOCUMENTS

| | | | |
|---|---|---|---|
| EP | 0 238 140 | 9/1987 | |
| EP | 0 492 463 | 7/1992 | |
| EP | 0 563 578 | 10/1993 | |
| FR | 2 512 453 | 3/1983 | |
| JP | 61-137750 | 6/1986 | ............... B41J/3/04 |
| JP | 63-009550 | 1/1988 | |
| JP | 1-170674 | 7/1989 | |
| JP | 1-170675 | 7/1989 | |
| JP | 5-8405 | 1/1993 | .......... B41J/21/175 |
| JP | 6-71885 | 3/1994 | ............... B41J/2/05 |
| WO | 82/02169 | 7/1982 | |
| WO | 98/03340 | 1/1998 | |

OTHER PUBLICATIONS

Chem Abstract: 112:8832 "Emulsion jet printing inks" Takeshi et al 1989 111:216134 "Water thinred inks for ink–jet printing" "Takeshi et al" 1989.*

* cited by examiner

Primary Examiner—Duc Truong
(74) Attorney, Agent, or Firm—Fitzpatrick, Cella, Harper & Scinto

(57) ABSTRACT

Disclosed herein is an ink-contacting member used in an ink-jet recording apparatus, which comprises, as a principal component, a resin material obtained by adding a phenolic antioxidant having an isocyanurate skeleton represented by the formula.

22 Claims, 4 Drawing Sheets

INK-CONTACTING MEMBER, INK-ABSORBING MEMBER, INK TANK AND INK-JET CARTRIDGE

BACKGROUND OF THE INVENTION

1. Field of the Invention

The present invention relates to members with which an ink comes into contact (hereinafter referred to as "ink-contacting members"), such as ink-absorbing members, ink tanks and ink cartridges which are used in ink-jet recording apparatus.

2. Related Background Art

An ink-jet recording apparatus has a general construction that an ink tank for storing an ink therein, and an ink-jet recording head portion for ejecting the ink from the ink tank to conduct printing are connected to each other directly or through an ink-feeding member such as a tube. In such an ink-jet recording apparatus, resin materials, metallic materials, rubber materials and/or the like have heretofore been used for members always coming into contact with an ink. Of these materials, the resin materials have preferably been used from the viewpoints of cost and processability.

Examples of the resin materials include polyolefins, ABS, PS, PET, PVC, etc. Of these resin materials, the polyolefins are particularly preferably utilized from the viewpoints of the chemical resistance, the easiness to be recycled and the costs. Examples of the polyolefins include polyethylene, polypropylene and ethylene-propylene copolymers.

It has been known that additives are generally added to such a resin material, as needed, for the purpose of stabilizing its quality. In some cases, the resin materials may be oxidized by heat, light, oxygen or the like during their manufacturing process or processing process, or after the processing to cause decomposition or deterioration (autoxidation). Therefore, it is desirable to add an antioxidant to the resin materials taking the stability of quality into consideration.

Of autoxidation mechanisms of the resin materials, for example, the following mechanisms are well known.

| | | |
|---|---|---|
| Chain initiation: | RH | → R• |
| Chain propagation: | R• + O$_2$ | → ROO• |
| | ROO• + RH | → ROOH + R• |
| Chain transfer: | ROOH | → RO• + •OH |
| | RH + •OH | → ROO• + RO• + H$_2$O |
| | RO• + RH | → ROH + R• |
| Chain termination: | R• + R• | → R-R |
| | R• + RO• | → ROR |
| | RO• + •OH | → ROH. |

An antioxidant is added for the purpose of preventing the autoxidizing action. It is also desirable to add a radical scavenger to the resin materials in order to scavenge radicals generated at the initial chain propagation step of the autoxidizing action. Examples of the radical scavenger include phenolic antioxidants and amine type antioxidants.

An ink-jet recording head portion of an ink-jet recording apparatus will now be described. An energy-generating member such as a piezoelectric element or electrothermal converter is used as a member for applying a pressure for ejecting an ink in the ink-jet recording head. A thermal ink-jet recording head in which an electrothermal converter is used as the energy-generating member will be described. In this head, an extremely small amount of ink adjacent to the electrothermal converter is rapidly heated by the electrothermal converter, whereby the ink is bubbled. The ink is ejected toward a recording medium such as paper from ink ejection orifices by a pressure generated by this bubbling, thereby conducting recording.

An example of the construction of this ink-jet recording head will be described by reference to FIG. 5.

An ink-jet recording head 51 has several to several tens of, and further several hundreds of ink ejection orifices 52 at its surface opposite to a recording medium such as paper (two orifices thereof being illustrated in FIG. 5). The ink-jet recording head 51 is also provided with ink flow paths 53 in respective communication with the ink ejection orifices 52, and energy-generating members for ejecting an ink, or thin film resistors 55 as electrothermal converters in this case are formed in correspondence with the respective ink flow paths 53 on a substrate 54 which makes up the ink-jet recording head 51.

Each of the thin film resistors 55 rapidly generates heat by electric pulses applied in response to drive data to bubble the ink adjacent to the thin film resistor 55. The ink is ejected from the ink ejection orifice 52 following the formation of bubbles by this bubbling. A common liquid chamber 56 commonly connected to the ink flow paths 53 is provided at the respective ink flow paths 53, and the ink stored in the liquid chamber is fed to the ink flow paths 53 in response to the ejecting operation in the respective ink flow paths 53.

Generally, ink-contacting members in an ink-jet recording apparatus are generally constructed by plural members such as an energy-generating member and an ink feed tube, and these members slightly differ in wettability with inks from each other, so that the flow of the ink passing through the ink-contacting member may become unstable. When the ink is ejected at a high speed in particular, therefore, the supply of the ink to the ink flow path may become unstable, and so the ejection velocity of the ink is reduced or made irregular. Accordingly, such an ink becomes liable to hold bubbles therein and hence has a possibility that the size of ink droplets may become varied, or the ejection direction of the ink may be disordered, resulting in deterioration of print quality.

When these bubbles stay in the ink for a long period of time, the bubbles are enlarged by gases or the like dissolved in the ink, which may cause the state of ejection failure of the ink in an considerable case.

In particular, an ink-jet recording method has recently been required to output an image of photograph-like image quality and hence to output a more bright or clearer color-image. Therefore, it has been required that the impact accuracy of an ink when conducting printing on a recording medium is improved, and that droplets of the ink ejected are made smaller. Therefore, it is necessary to more smooth the flow of the ink than before so as not to cause the retention of bubbles. As a measure for this, Japanese Patent Application Laid-Open No. 61-137750 has proposed a method for preventing the retention of bubbles, in which an ink-feeding member in an ink-jet recording apparatus is subjected to a lamination treatment with a compound having both hydrophilic group and hydrophobic group, thereby enhancing the wettability of the ink-feeding member with inks.

Japanese Patent Application Laid-Open No. 6-71885 has proposed a method for preventing the retention of bubbles, in which ions are implanted into a part of an ink-jet recording apparatus, with which an ink comes into contact, by ion implantation to conduct a hydrophilicity-imparting treatment, thereby enhancing the wettability of the ink-contacting member with inks. However, the above method comes to increase production cost, since a step of treating the ink-contacting part or member must be added upon the production of the ink-jet recording apparatus.

In the compound-laminating treatment proposed in Japanese Patent Application Laid-Open No. 61-137750, production cost is increased in that materials for making up the ink-jet recording apparatus must be increased. In addition, the method involves many problems such that the effect is observed only in the coated surface, and the material for the treatment must be selected in view of its adhesion property to a surface to be treated whenever a material for making up the ink-jet recording apparatus is changed.

SUMMARY OF THE INVENTION

Accordingly, it is an object of the present invention to provide an ink-contacting member by which the flow of an ink within an ink-jet recording apparatus can be simply smoothed without adding a new third component for an ink-jet recording head used only for the purpose of solving the above-described problems and naturally without adding a step attendant on the addition of the third component, thereby preventing printing failure and an ink breaking phenomenon due to the retention of bubbles to provide high-quality images stably.

Another object of the present invention is to provide an ink-absorbing member which permits achieving the stable recording of a high-quality image.

A further object of the present invention is to provide an ink tank which permits printing a high-quality image on a recording medium stably.

A still further object of the present invention is to provide an ink-jet cartridge useful in printing a high-quality image on a recording medium stably.

A yet still further object of the present invention is to provide an ink tank which can be used in recording excellent images stably.

A yet still further object of the present invention is to provide an ink-contacting member, an ink-absorbing member, an ink tank and an ink cartridge which permit achieving a further improvement of printing stability.

The present inventors have carried out an extensive investigation as to components of ink-jet printers with a view toward achieving the above objects. As a result, it has been found that when polyethylene, to which a phenolic antioxidant having an isocyanurate skeleton has been added, is used for an ink-contacting member, a substance having delicate wettability is eluted in an ink. The present invention has been led to completion on the basis of a quite new point of view that attention is paid to the component eluted out of the ink-contacting member for overcoming the above-described problems.

Namely, the above objects can be achieved by the present invention described below.

According to the present invention, there is thus provided an ink-contacting member used in an ink-jet recording apparatus, which comprises, as a principal component, a resin material obtained by adding a phenolic antioxidant having an isocyanurate skeleton represented by the formula

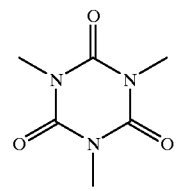

(I)

According to the present invention, there is also provided an ink-absorbing member used in an ink-jet recording apparatus, which comprises, as a principal component, a resin material obtained by adding a phenolic antioxidant having an isocyanurate skeleton represented by the formula (I).

According to the present invention, there is further provided an ink tank used in an ink-jet recording apparatus, comprising an ink-absorbing member capable of holding an ink therein, and a casing housing the ink-absorbing member therein and having an opening part communicating with the air, wherein the ink-absorbing member comprises, as a principal component, a resin material obtained by adding a phenolic antioxidant having an isocyanurate skeleton represented by the formula (I).

According to the present invention, there is still further provided an ink-jet cartridge comprising an ink-absorbing member capable of holding an ink therein, an ink tank housing the ink-absorbing member therein, and an ink-jet recording head for ejecting the ink to be fed from the ink tank, wherein the ink-absorbing member comprises, as a principal component, a resin material obtained by adding a phenolic antioxidant having an isocyanurate skeleton represented by the formula (I).

According to the present invention, there is yet still further provided an ink tank capable of storing an ink to be fed to an ink-jet recording head, wherein at least a part of the ink tank, with which an ink comes into contact, comprises, as a principal component, a resin material obtained by adding a phenolic antioxidant having an isocyanurate skeleton represented by the formula (I).

Of the phenolic antioxidants having the isocyanurate skeleton represented by the formula (I), tris(4-tert-butyl-2,6-dimethyl-3-hydroxybenzyl)-isocyanurate may be preferred. The resin material may preferably be polyolefin, and the ink-contacting member may preferably be composed of an aggregate of polyolefin fibers. The polyolefin may preferably be polypropylene or polyethylene.

DETAILED DESCRIPTION OF THE PREFERRED EMBODIMENTS

Figure 1:
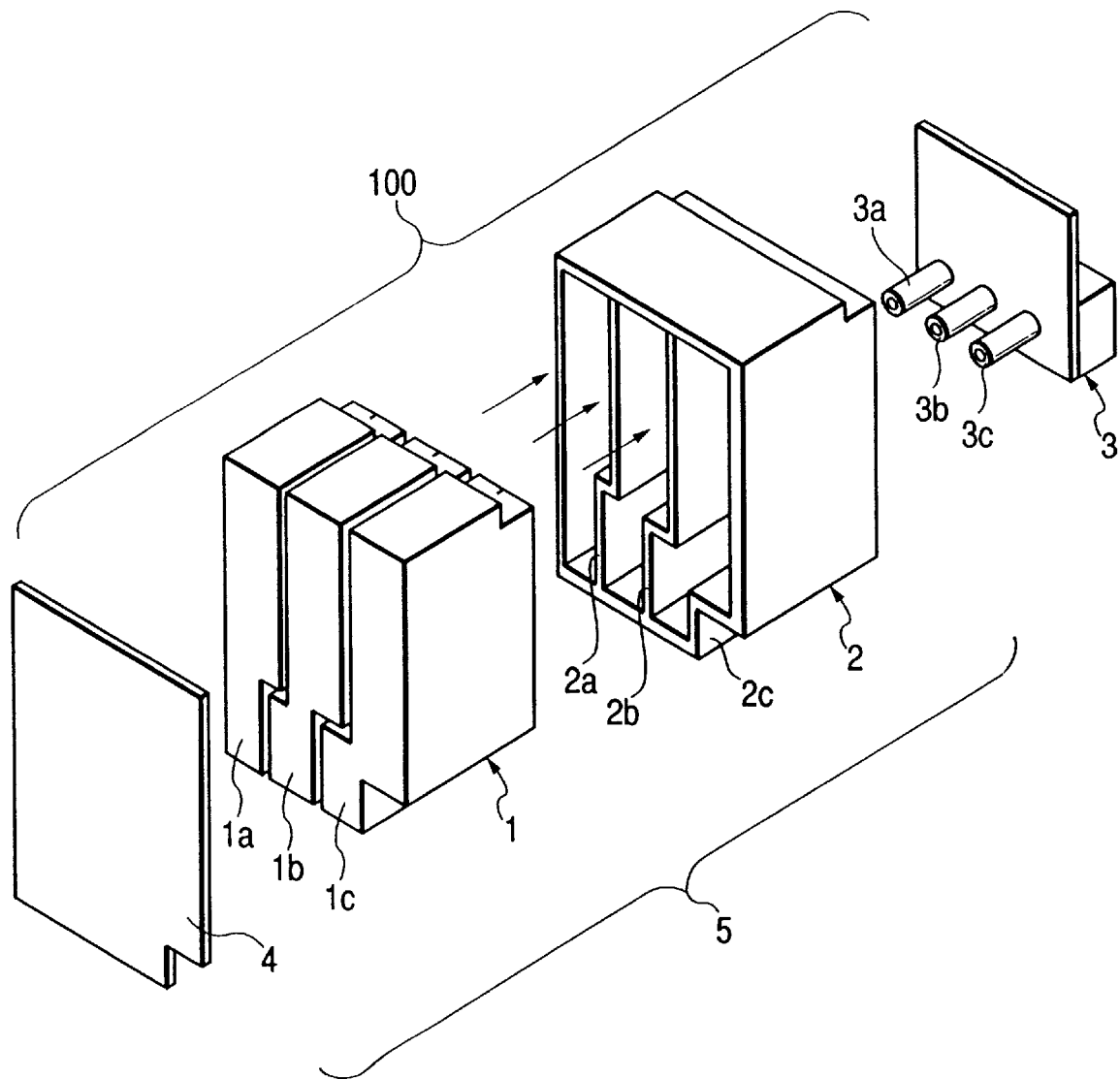
FIG. 1 is an exploded perspective view of an ink-jet cartridge according to the present invention.

The present invention will hereinafter be described in more detail with reference to the preferred embodiments of the present invention.

An ink-contacting member according to an embodiment of the present invention comprises a resin material obtained by adding a phenolic antioxidant having the isocyanurate skeleton described below. The use of such an ink-contacting member permits improving the wettability between the ink-absorbing member and inks used and can exhibit the effect of effectively preventing printing failure and an ink breaking phenomenon due to the retention of bubbles.

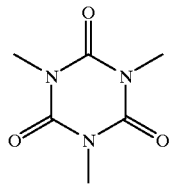

Specific examples of the phenolic antioxidant having the isocyanurate skeleton described above include tris(4-tert-butyl-2,6-dimethyl-3-hydroxybenzyl)-isocyanurate, tris(3,5-di-tert-butyl-4-hydroxybenzyl)-isocyanurate and tris(2-(3',5'-di-tert-butyl-4'-hydroxyhydro-cinnamoyloxy)ethyl)isocyanurate. Of these, tris(4-tert-butyl-2,6-dimethyl-3-hydroxybenzyl)isocyanurate is particularly preferred.

These antioxidants are generally added in a proportion of from 0.01 to 1 part by weight per 100 parts by weight of the resin.

According to an investigation by the present inventors, it has been identified by the analysis of an ink after it was stored in an ink tank made from this resin material and left to stand in such an environment that the phenolic antioxidant becomes easy to be eluted in the ink (for example, for 24 hours at a temperature of 70° C.) that a substance having a nitrile bond exists therein. On the basis of this fact, the reason why the above-described effect can be achieved by adopting the constitution of the present invention is considered to be as follows. Incidentally, a case where tris(4-tert-butyl-2,6-dimethyl-3-hydroxybenzyl)-isocyanurate was used as the phenolic antioxidant will be described in detail herein.

When a resin containing the phenolic antioxidant is melted at a considerably high temperature upon its processing by molding or forming, for example, the production of fiber, it is assumed that the phenolic antioxidant is decomposed at the part of the isocyanurate skeleton upon the processing to form a substance having a nitrile bond. The decomposed product of the phenolic antioxidant is easy to separate from the resin because its molecular weight is lowered. It is therefore considered that the decomposed product is eluted in an ink when the resin is used in an ink-contacting member. In addition, since the ink coming into contact with such a member is generally alkaline, it is assumed that the phenolic antioxidant is also decomposed in the following manner by hydrolysis with the ink.

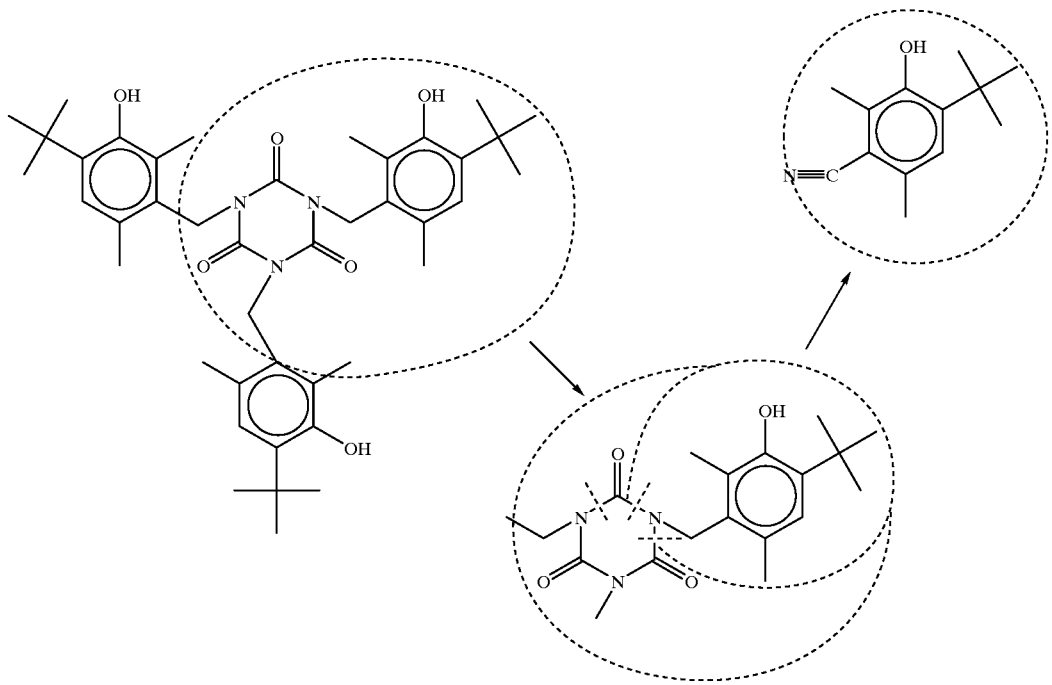

The decomposed product eluted in the ink by the decomposition at the part of the isocyanurate skeleton as shown in the above decomposition reaction formula is considered to become a sort of substance having a surface-active effect, in which the moiety of a hydroxyl group of phenol becomes hydrophilic, and the moiety of an alkyl group becomes hydrophobic. Therefore, this decomposed product acts on a part of a surface coming into contact with the ink within an ink-jet recording head, said part being poor in wettability, thereby making up the difference in wettability between the ink and the surface coming into contact with the ink. In particular, according to the constitution of the present invention, the effect of the present invention is always brought about on the surface coming into contact with the ink because the above-described substance is eluted in the ink and exists therein. In other words, the effect is brought about even at a site of the ink-contacting member, which is not specially coated so as to have hydrophilicity. Even when printing is conducted at a high speed, the generation of bubbles can be prevented because the flow of the ink itself is stabilized. Further, since the wetting effect of this substance is not so high as surfactants, the substance does not change the penetrability of the ink into the surface of paper to the degree that the quality of a print is changed.

The resin material obtained by adding the phenolic antioxidant having the isocyanurate skeleton can be formed or molded by any conventionally-known forming or molding method such as extrusion or injection molding into an ink-contacting member according to the present invention, such as an ink-absorbing member, ink container bag or ink feed tube. Incidentally, no particular limitation is imposed on the individual forms of the various ink-contacting members formed, and they may be in any conventionally-known forms. To the resin material according to the present invention, may be added, for example, a pigment, antistatic agent, surface-treating agent, lubricant, flame retardant, germicide, nucleating agent, plasticizer and/or the like as needed. When these additives are added, however, they may preferably be used after their properties against inks are taken into full consideration to sufficiently investigate them as to whether they cause problems or not, or an adverse influence is exerted or not when eluted in the inks.

The preferred embodiments of the present invention will be described more specifically with reference to the accompanying drawings.

FIG. 1 is an exploded perspective view schematically illustrating an ink-jet cartridge equipped with ink-absorbing members to which the present invention may be applied. The ink-jet cartridge 100 is composed of an ink-jet recording head 3 from which inks of yellow (Y), magenta (M) and cyan (C) colors are separately ejected, and an ink tank 5 detachably installed to the ink-jet recording head 3. The ink-jet recording head 3 is connected to the ink tank 5 through ink feed tubes 3a, 3b and 3c provided correspondingly to the respective colors. The inks are fed to the ink-jet recording head 3 through their corresponding ink feed tubes. In the ink tank 5, the interior of a container making up the casing 2 together with a lid member 4 is partitioned into 3 chambers by two partition members 2a and 2b, and the ink-absorbing members 1a, 1b and 1c, which respectively hold the Y, M and C inks therein, are held in the respective chambers. An opening part (not illustrated) communicating with the air is provided in each of the chambers so as to communicate the interior of the casing 2 with the air.

The external shape of the ink tank 5 is so designed that a recess 2c is provided in a part of the casing 2 for avoiding interference with the interior of an apparatus when the ink tank 5 is installed in the apparatus. From the viewpoint of the amount of an ink to be contained, all the three chambers are shaped according to the recess, and so the partition members 2a and 2b are formed so as to have a bent portion at a part thereof.

Figure 2:
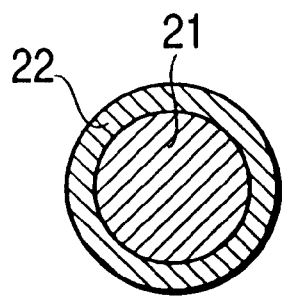
FIG. 2 is a cross-sectional view of a fiber making up an ink-absorbing member according to the present invention.

The ink-absorbing members 1a, 1b and 1c respectively held in regions (hereinafter referred to as the interiors of the casing, or the chambers for holding the ink-absorbing members) surrounded by the casing 2 and partition members 2a and 2b of the ink tank 5 each have an external surface equivalent or corresponding to the configuration of the internal surface (hereinafter referred to as the internal surface of the casing) of its corresponding chamber for holding the ink-absorbing member, and are formed by compressing a composite fiber formed by covering a polypropylene core 21 with a polyethylene shell 22 at a weight ratio of 1:1 as illustrated in FIG. 2, so as to conform to the shapes of the respective chambers in the casing 2 and thermoforming their surfaces.

The production process of the ink tank 5 illustrated in FIG. 1 will now be described in brief.

First of all, a continuous, elastic fiber aggregate in the form of a rod or plate is molded. The continuous fiber aggregate is then cut by a cutter into standard units to form fiber masses. The fiber mass is inserted into a mold having a shape conforming to the internal configuration of the chamber for holding the ink-absorbing member in the ink tank 5 (almost the same size as or a somewhat larger size than the chamber) to compress it, and then heated in a heating oven, thereby forming an ink-absorbing member 1. In this case, plural fiber masses may be inserted into the mold according to the form and size of the ink tank 5 to laminate them, and then thermoformed. After that manner, the ink-absorbing member 1 according to the form and size of the tank may be formed with ease. The ink-absorbing member 1 is taken out of the mold and inserted into the chamber for holding the ink-absorbing member, and the lid 4 is fitted, thereby completing the ink tank 5.

The temperature of the heating oven may be optional so far as it is higher than the melting point of the polyethylene fiber 22 as a shell, but lower than the melting point of the polypropylene fiber 21 as a core. For example, in the case where the melting point of the polyethylene fiber 22 is 132° C., it is preferred that the temperature of the heating oven be from 135° C. to 155° C. The heating time can be controlled according to necessary strength for the ink-absorbing member. The ink-absorbing member 1 and the casing 2 of the ink tank are preferably formed with homogeneous materials, for example, polyolefin resins, from the viewpoint of recycle. When a label for identification is provided on the ink tank, the label is also preferably formed with a homogeneous material.

Figure 3A:
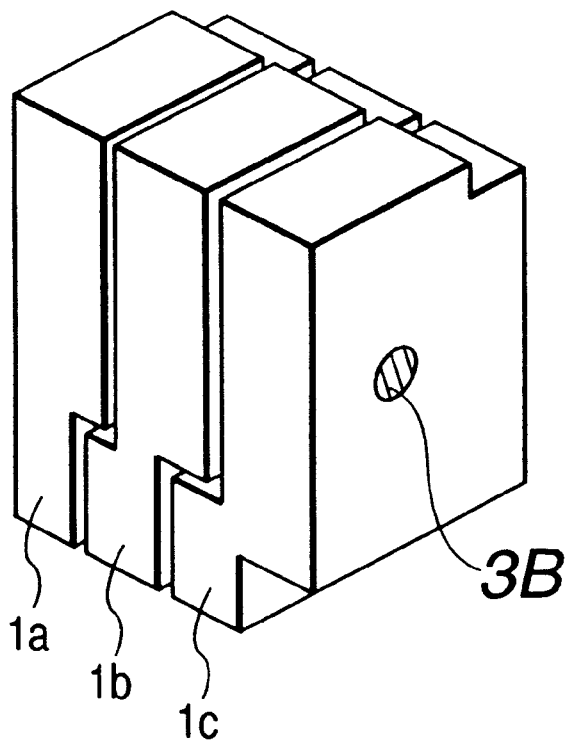
FIGS. 3A and 3B are a conceptual view of an ink-absorbing member according to the present invention, and an enlarged view illustrating the structure thereof, respectively.
Figure 3B:
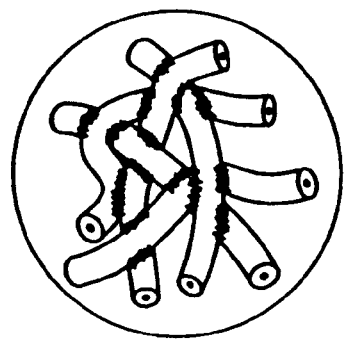

As illustrated in FIGS. 3A and 3B, the ink-absorbing members 1a, 1b and 1c according to this embodiment are so constructed that the polyethylene fiber is melted by applying heat to serve as an adhesive, and so three-dimensionally interlocking intersections of the polypropylene fibers are fixed, thereby forming a fiber mass capable of developing strength.

Figure 4:
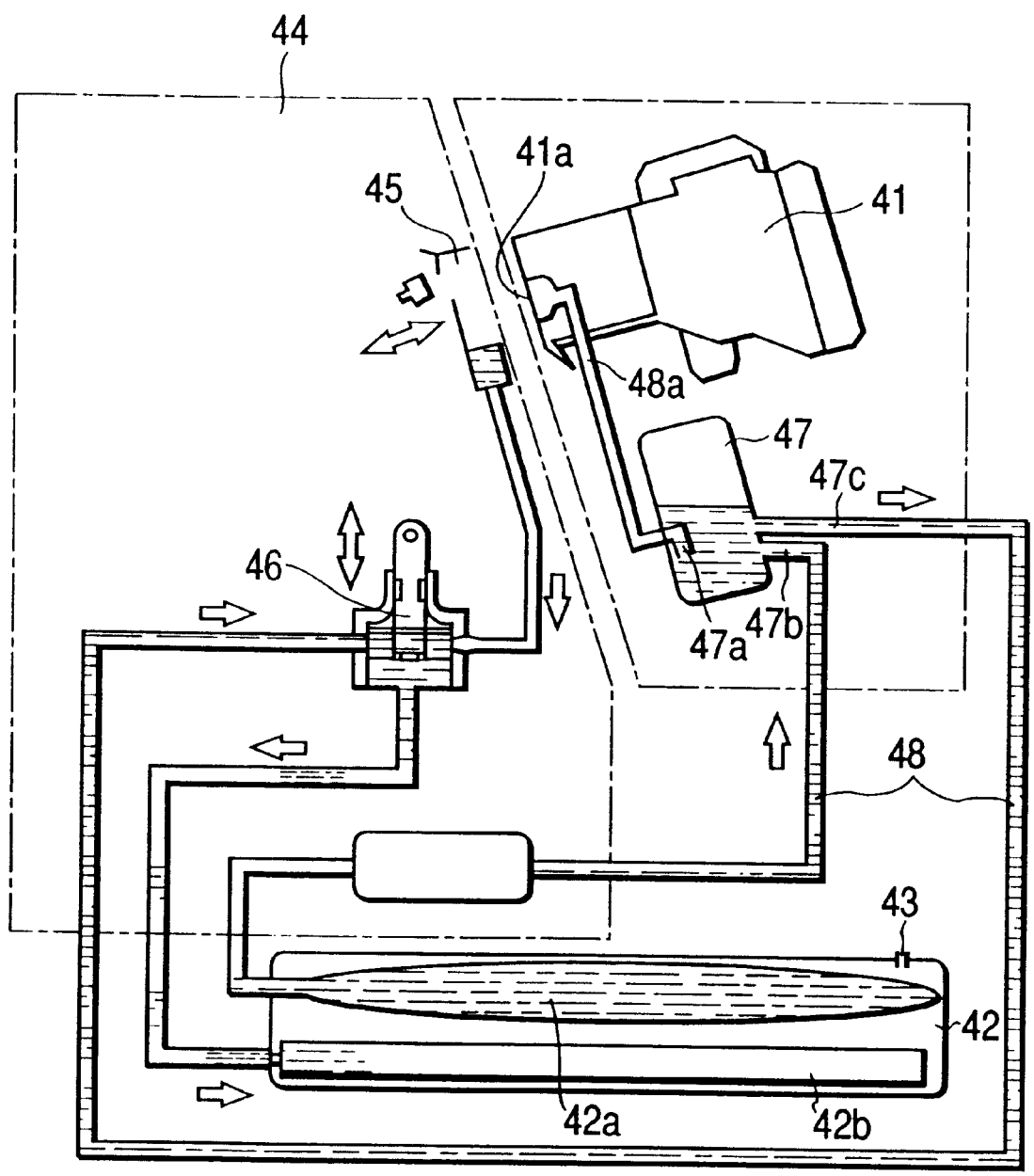
FIG. 4 is a conceptual view of an ink-jet recording apparatus using ink-contacting members according to the present invention.
Figure 5:
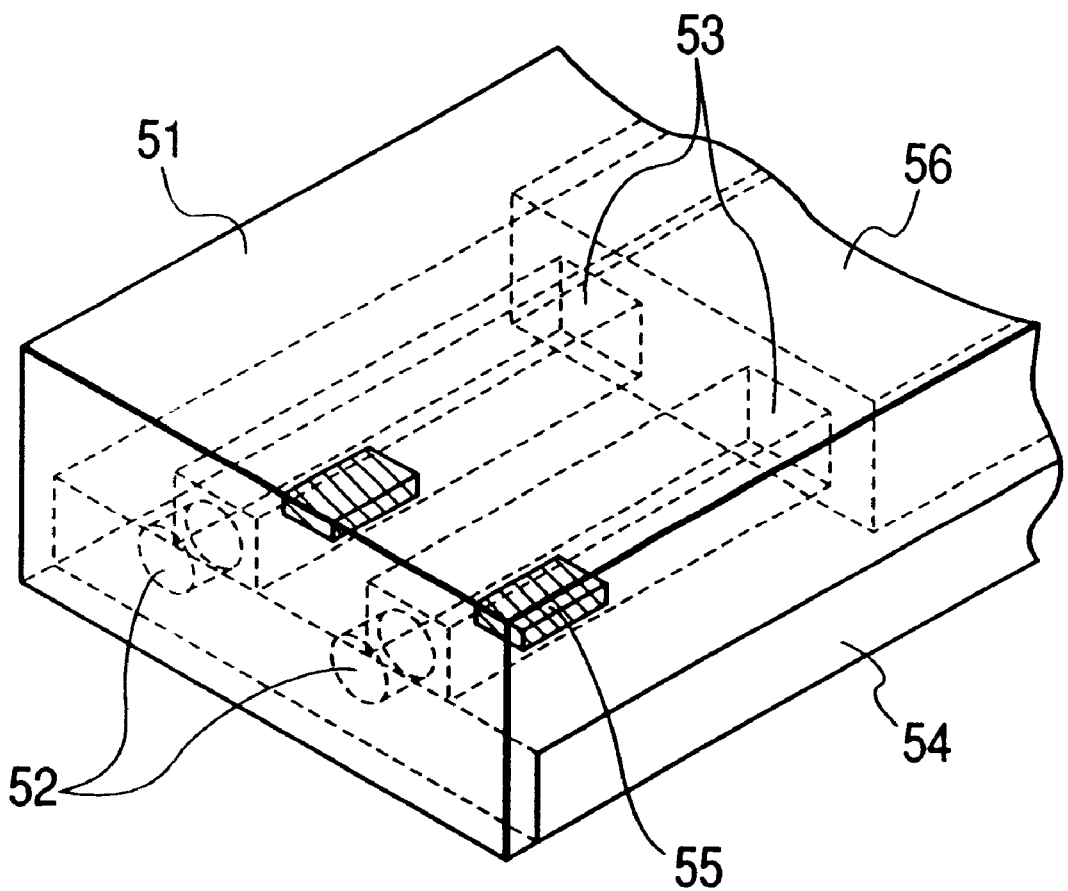
FIG. 5 is a conceptual view of an ink-jet recording head.

FIG. 4 illustrates an exemplary ink-jet recording apparatus equipped with an ink tank having an ink container portion in the form of a bag. In FIG. 4, reference numeral 41 indicates an ink-jet recording head having ejection orifices 41a for ejecting an ink. This ink-jet recording head 41 is mounted on a carriage (not illustrated) to conduct record scanning upon conducting recording on a recording medium or the like.

Reference numeral 42 indicates an ink tank replaceably installed in the recording apparatus, and 42a a flexible ink container bag for holding an ink used in recording. Reference character 42b indicates a waste ink container portion for receiving a waste ink, which will be described subsequently. An opening part 43 communicating with the air is provided in the ink tank 42, whereby the change in shape of the bag-like ink container 42a with the consumption of the ink becomes feasible.

Reference numeral 44 indicates a recovery means for recovering an ink ejecting function, which is provided outside a record scanning region of the ink-jet recording head 41 and has a cap 45 for covering an ink ejection orifice 41a. The recovery of the ink ejection orifice 41a is intended to solve clogging and the like at the ejection orifice 41a by subjecting an ejection opening part to suction through the cap 45 by means of a pump 46.

Reference numeral 47 indicates an ink subtank mounted on the carriage, on which the ink-jet recording head is mounted, or the like. The ink subtank 47 is a temporary ink storage part provided in the course of an ink feed line for feeding the ink from the ink tank 42 to the ink-jet recording head 41. An air layer is provided at the upper part within this ink subtank 47.

Reference character 47a designates an ink-feeding part for feeding the ink in the ink subtank 47 to the ink-jet recording head 41, and 47b an ink inlet part for introducing the ink in the ink tank 42 into the ink subtank 47.

Reference character 47c indicates an outlet part for discharging air and the ink in the ink subtank 47 therefrom for controlling an ink quantity in the ink subtank 47. The outlet part 47c is provided so as to be located above the ink inlet part 47b in a direction of gravity, while the ink-feeding part 47a is provided so as to be located below the ink inlet part 47b in a direction of gravity. The above air layer is situated above the ink outlet part 47c. Incidentally, the discharge of the ink and the like from the ink subtank 47 is made by a pressure change caused by the pump 46.

The ink discharged from the ink subtank 47 and cap 45 by means of the pump 46 is stored in the waste ink container portion 42b through an ink tube 48.

In the ink subtank 47, an ink level is normally kept constant to maintain a difference of elevation from the ink-jet recording head 41, thereby realizing stable generation of negative pressure. Since the ink subtank 47 is of a closed type, the ink is successively fed from the ink tank 42 to the ink-jet recording head 41 through the ink tubes 48 and 48a. The rocking of the ink within the ink subtank 47 caused upon movement of the carriage due to record scanning or the like is reduced to some extent because the air layer has a damper-like effect.

At least one, preferably, all of the various ink-contacting members described above are formed mainly with a resin material obtained by adding the phenolic antioxidant having the isocyanurate skeleton according to the present invention.

As described above, the resin materials obtained by adding the phenolic antioxidant having the isocyanurate skeleton are used for ink-contacting members such as ink-absorbing members, ink tanks and ink cartridges, whereby they can be provided as ink-contacting members having the effect of smoothing the flow of an ink within an ink-jet recording head to make the retention of bubbles difficult.

The present invention will hereinafter be described more specifically by the following examples.

EXAMPLE 1

In a composite polyolefin fiber of a core and shell structure used in the formation of ink-absorbing members 1 illustrated in FIG. 1, a phenolic antioxidant having the isocyanurate skeleton [tris(4-tert-butyl-2,6-dimethyl-3-hydroxybenzyl)isocyanurate] was added in an amount of about 0.1 parts by weight only to polyethylene as a material for the shell with which an ink comes into direct contact.

The ink-absorbing members 1 were then held in a casing 2 of an ink tank to form an ink tank 5, and respective inks were then charged into the absorbing members. An ink-jet recording head equipped with an ink ejection structure was then fitted to the ink tank to produce an ink cartridge 100 (Example A).

Another ink cartridge (Example B) obtained by heating the above ink cartridge 100 at a temperature of 70° C. for 24 hours so as to facilitate the elution of a decomposition product of the phenolic antioxidant having the isocyanurate skeleton from the ink-absorbing members 1 in the respective inks, and a further ink cartridge (Comparative Example A), in which the phenolic antioxidant having the isocyanurate skeleton [tris(4-tert-butyl-2,6-dimethyl-3-hydroxybenzyl) isocyanurate] was not added to polyethylene, were then provided.

The behavior of the three ink cartridges upon ejection of the inks was observed.

Incidentally, ink ejection conditions were as follows. Namely, a process of conducting recovery operation by ink suction by a printer itself after every fifth whole solid printing on A4-sized paper to print a pattern for evaluation of print quality on the paper was conducted repeatedly. The results are shown in Table 1.

TABLE 1

|  | Antioxidant having isocyanurate skeleton | Heat history of cartridge | Result |
| --- | --- | --- | --- |
| Example A | Added | Not applied | B |
| Example B | Added | Applied | A |
| Comp. Ex. A | Not added | Not applied | C |

(Note)
A: Good prints were obtained stably until the inks ran out;
B: Deterioration (defective ink-droplet impact) of print quality was observed in the course of the test, but immediately recovered;
C: Deterioration (defective ink-droplet impact) of print quality was observed in the course of the test, and plural times of recovery operation were required to recover.

As shown in Table 1, it is understood that good images were obtained more stably in Examples using the ink-contacting members according to the present invention than in Comparative Example. In Example A and Comparative Example A, the deterioration of print quality was observed in the course of the test. Therefore, the interior of the common liquid chamber was observed through the ink ejection orifice. Slight bubbles were then observed in corners of the common liquid chamber in both examples. The constitution according to Comparative Example A required plural times of recovery operation to recover the print quality. On the other hand, the print quality was able to be recovered by one recovery operation of the printer in Example A. As described above, it is understood that even when the deterioration of print quality is observed, the print quality is recovered with greater ease in Example A. In particular, the excellent print result was obtained in Example B in which the ink cartridge was subjected to the heat treatment. It is therefore considered that the elution of a decomposition product of the phenolic antioxidant having the isocyanurate skeleton was facilitated due to the heat history of the ink cartridge to obtain a better effect.

For example, the material for the ink-absorbing members is not limited to the composite fiber of the core-shell structure composed of at least two polyolefins as described in the above Example. At least two materials may be separately formed into fibers, and these fibers may be mixed before use. It goes without saying that the compositional ratio of the two materials is also not limited to 1:1, and a simple fiber composed of one material may be used. The present invention is also not limited to the structure that one material is used as an adhesive by heating it at a prescribed temperature to fix three-dimensionally-interlocking intersections of the fibers formed of the other material, thereby developing strength.

For example, the material for forming the ink-absorbing member and the like may be composed of only one material, and its structure may also be in the form of a nonwoven fabric such as the conventionally-known felt. Besides, there may be adopted a structure that fibers composed of a polyolefinic material according to the present invention, from which an ink-absorbing member is form, are linearly bundled as disclosed in, for example, Japanese Patent Application Laid-Open No. 5-8405. Such a structure is effective for both ink-feeding ability and decrease in leftover ink.

EXAMPLE 2

Four kinds of fibers of a core and shell structure, in which the phenolic antioxidant was added to polyethylene as a shell in the same manner as in Example 1, and a core was composed of polypropylene, were provided. The respective fibers were prepared in such a manner that the maximum experienced temperatures of polyethylene reached 240° C., 270° C., 300° C. and 330° C., respectively, in the production step thereof. The respective fibers were heated at about 150° C. to melt the surface of polyethylene forming the shell of the core and shell structure, thereby molding the fibers into fiber masses to produce 4 ink-absorbing members.

The ink-absorbing members were separately held in a casing of an ink tank, and an ink was charged into the ink tank. An ink-jet recording head was fitted to the ink tanks thus obtained to produce ink cartridges. Each of the ink cartridges was left to stand for 24 hours in an environment of 70° C. so as to facilitate the elution of the phenolic antioxidant from the ink-absorbing member into the ink. The ink in the tank was then drawn out up to the ink ejection orifices of the ink cartridge and left to stand at ordinary temperature for 10 days as it is. With respect to the respective ink cartridges after left to stand for 10 days, the degree of deposition of components in the ink about the ink ejection orifices was visually observed. The results are shown in Table 2.

Further, each of the ink cartridges after left to stand for 10 days was installed in an ink-jet printer to repeatedly conduct a process of conducting recovery operation by ink suction by the printer itself after every fifth whole solid printing on A4-sized paper to print a pattern for evaluation of print quality on the paper, thereby observing the quality of the thus-obtained prints until the ink ran out. The results are shown in Table 2.

TABLE 2

| Maximum experienced temp. of resin for forming ink-absorbing member | Deposit about ink ejection orifice | Print quality |
| --- | --- | --- |
| 240° C. | A | A |
| 270° C. | B | A |
| 300° C. | C | A |
| 330° C. | C | A |

(Note)
Deposition about ink ejection orifice:
A: Deposit was scarcely observed;
B: Deposit was somewhat observed;
C: Deposit was observed.
Print quality:
A: Good prints were obtained stably.

From the above results, it is understood that the deposition of components in the ink about the ink ejection orifices was such a degree that it can be scarcely observed by visual inspection even when the ink cartridge was left to stand at ordinary temperature for 10 days in the case where the maximum experienced temperature of the resin was controlled to 240° C. In the case where the maximum experienced temperature was controlled to 270° C., the deposition of components in the ink was somewhat observed about the ink ejection orifices. In the cases where the maximum experienced temperatures were controlled to 300° C. and 330°, respectively, the deposition of components in the ink was observed. However, in each case, the deposit of components in the ink about the ink ejection orifices did not affect the print quality. In addition, with respect to the improvement of print quality by virtue of the improvement of wettability by using the ink-contacting member comprising the resin material containing the phenolic antioxidant having the isocyanurate skeleton, its effect was confirmed.

From the above results, it is preferred that the maximum experienced temperature of the resin material, from which the ink-contacting member is formed, be controlled so as not to exceed 330° C., preferably 240° C., since the deposition of components in the ink about the ink ejection orifices is more effectively prevented.

Other Examples:

The principal part of the present invention has hereinbefore been described. However, it goes without saying that the present invention is not limited to the above-described ink-absorbing members and may also be applied to other ink-contacting members which come into contact with inks in the course of an ink feed line in an ink-jet recording apparatus. Thus, other application examples to which the present invention may be preferably applied as illustrated in FIG. 4 will be described. In an ink-jet recording apparatus illustrated in FIG. 4, an ink container bag 42a, an ink tube 48 and a container for directly receiving an ink, such as a subtank 47, with which an ink to be fed to an ink-jet recording head comes into contact, are formed from a resin material obtained by adding the phenolic antioxidant having the isocyanurate skeleton according to the present invention, thereby achieving the same effect as in Examples 1 and 2. It goes without saying that the ink container bag, ink tube and container for directly holding an ink are also not limited to the forms shown in these examples or application examples, and the present invention may be applied to various other forms.

What is claimed is:

1. An ink-contacting member for use in an ink-jet recording apparatus, which comprises, as a principal component, a resin material obtained by adding a phenolic antioxidant having an isocyanurate skeleton represented by the following formula:

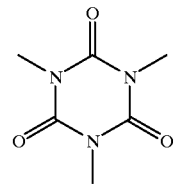

wherein the resin material is polyolefin.

2. The ink-contacting member according to claim 1, wherein the phenolic antioxidant having the isocyanurate skeleton is tris (4-tert-butyl-2,6-dimethyl-3-hydroxybenzyl)isocyanurate.

3. The ink-contacting member according to claim 1, wherein the polyolefin is polypropylene or polyethylene.

4. The ink-contacting member according to claim 1, wherein maximum experienced temperature of the resin material does not exceed 330° C.

5. An ink-absorbing member for use in an ink-jet recording apparatus, which comprises, as a principal component, a resin material obtained by adding a phenolic antioxidant having an isocyanurate skeleton represented by the following formula:

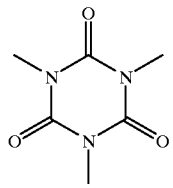

wherein the resin material is polyolefin.

6. The ink-absorbing member according to claim 5, wherein the phenolic antioxidant having the isocyanurate skeleton is tris (4-tert-butyl-2,6-dimethyl-3-hydroxybenzyl)isocyanurate.

7. The ink-absorbing member according to claim 5, wherein the polyolefin is polypropylene or polyethylene.

8. The ink-absorbing member according to claim 5, wherein the ink-absorbing member comprises an aggregate of polyolefin fibers.

9. The ink-absorbing member according to claim 5, wherein the ink-absorbing member is formed by laminating at least two fiber masses.

10. The ink-absorbing member according to claim 5, wherein the ink-absorbing member is formed with at least plural kinds of fibrous materials different in melting point from each other.

11. The ink-absorbing member according to claim 8, wherein the polyolefin fibers are composite fibers.

12. The ink-absorbing member according to claim 11, wherein the composite fibers have a structure that a polypropylene core is covered with a polyethylene shell.

13. The ink-absorbing member according to claim 12, wherein the shell contains the phenolic antioxidant.

14. The ink-absorbing member according to claim 5, wherein the maximum experienced temperature of the resin material containing the phenolic antioxidant, of which the ink-absorbing member is composed, does not exceed 330° C.

15. A resinous member that contacts an ink for an ink-jet recording apparatus, the member comprising, as a principal component, a resin material obtained by adding a phenolic antioxidant having an isocyanurate skeleton represented by the following formula:

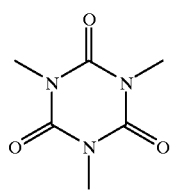

(I)

wherein the resin material is polyolefin.

16. An ink-contacting member for use in an ink-jet recording apparatus, which comprises, as a principal component, a resin material obtained by adding a phenolic antioxidant having an isocyanurate skeleton represented by the following formula:

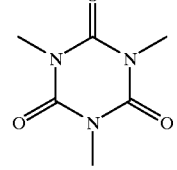

wherein the resin material is polypropylene or polyethylene.

17. An ink-absorbing member for use in an ink-jet recording apparatus, which comprises, as a principal component, a resin material obtained by adding a phenolic antioxidant having an isocyanurate skeleton represented by the following formula:

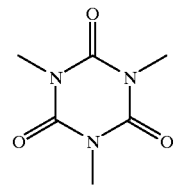

wherein the ink-absorbing member comprises an aggregate of polyolefin fibers.

18. The ink-absorbing member according to claim 17, wherein the polyolefin fibers are composite fibers.

19. The ink-absorbing member according to claim 18, wherein the composite fibers have a structure that a polypropylene core is covered with a polyethylene shell.

20. The ink-absorbing member according to claim 19, wherein the shell contains the phenolic antioxidant.

21. An ink-absorbing member for use in an ink-jet recording apparatus, which comprises, as a principal component, a resin material obtained by adding a phenolic antioxidant having an isocyanurate skeleton represented by the following formula:

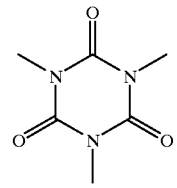

wherein the ink-absorbing member is formed by laminating at least two fiber masses.

22. An ink-absorbing member for use in an ink-jet recording apparatus, which comprises, as a principal component, a resin material obtained by adding a phenolic antioxidant having an isocyanurate skeleton represented by the following formula:

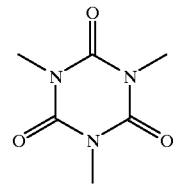

wherein the ink-absorbing member is formed with at least plural kinds of fibrous materials different in melting point from each other.

* * * * *

UNITED STATES PATENT AND TRADEMARK OFFICE
CERTIFICATE OF CORRECTION

PATENT NO. : 6,365,701 B1 Page 1 of 1
DATED : April 2, 2002
INVENTOR(S) : Hiroki Hayashi et al.

It is certified that error appears in the above-identified patent and that said Letters Patent is hereby corrected as shown below:

Title page,
Item [56], References Cited, OTHER PUBLICATIONS, "thinred" should read
-- thinned --; and
Item [57], ABSTRACT, "represented by the formula." should read -- represented by the formula

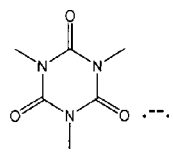

.--.

Column 2,
Line 44, "an considerable case." should read -- in a considerable proportion of cases. --.

Column 11,
Line 7, "form," should read -- formed, --;
Lines 34 and 38, "left" should read -- being left --; and
Line 65, "such" should read -- limited to such --.

Signed and Sealed this

Twenty-fifth Day of March, 2003

JAMES E. ROGAN
*Director of the United States Patent and Trademark Office*